(12) United States Patent
Kulkarni et al.

(10) Patent No.: US 8,263,186 B2
(45) Date of Patent: Sep. 11, 2012

(54) PAPER ARTICLES EXHIBITING LONG TERM STORAGEABILITY AND METHOD FOR MAKING SAME

(75) Inventors: Sandeep Kulkarni, Alpharetta, GA (US); Yuan Ling, Milford, OH (US); Rick C. Williams, Loveland, OH (US); Victor P. Holbert, Loveland, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 12/880,288

(22) Filed: Sep. 13, 2010

(65) Prior Publication Data

US 2011/0056639 A1    Mar. 10, 2011

Related U.S. Application Data

(60) Continuation of application No. 10/685,899, filed on Oct. 15, 2003, now Pat. No. 7,794,850, which is a division of application No. 10/117,358, filed on Apr. 5, 2002, now Pat. No. 6,645,642.

(60) Provisional application No. 60/283,677, filed on Apr. 12, 2001, provisional application No. 60/283,066, filed on Apr. 11, 2001, provisional application No. 60/283,055, filed on Apr. 11, 2001.

(51) Int. Cl.
*B05D 1/36* (2006.01)
(52) U.S. Cl. ....................................... 427/411
(58) Field of Classification Search .......... None
See application file for complete search history.

(56) References Cited

U.S. PATENT DOCUMENTS

| 3,038,277 A | 6/1962 | Cowan |
| 3,174,874 A | 3/1965 | Winter et al. |
| 3,293,114 A | 12/1966 | Kenaga et al. |
| 3,533,908 A | 10/1970 | Hoogsteen |
| 3,556,934 A | 1/1971 | Meyer |
| 4,040,900 A | 8/1977 | Mazzarella et al. |
| 4,133,688 A | 1/1979 | Sack |
| 4,179,546 A | 12/1979 | Garner et al. |

(Continued)

FOREIGN PATENT DOCUMENTS

DE    142217    10/1987

(Continued)

OTHER PUBLICATIONS

McLaughlin et al, Tappi, 40, pp. 146-151, 1957.

(Continued)

*Primary Examiner* — Erma Cameron
(74) *Attorney, Agent, or Firm* — Thomas W. Barnes, III; John K. Pike

(57) ABSTRACT

A method for increasing the long term storageability of a cellulosic paper or paperboard product. The method includes providing a paper or paperboard product made from cellulosic fibers having a basis weight ranging from about 80 to about 300 pounds per 3000 square feet. A holdout material is applied to at least one surface of the paper or paperboard product. The web is then coated with an ink receptive material selected from the group consisting of an aqueous acrylic polymer coating material, an aqueous biocidal agent and a combination of aqueous acrylic polymer coating material and aqueous biocidal agent and dried to provide a paper or paperboard product having enhanced long term storageability. Webs made according to the invention are suitable for making file folders which exhibit improve long term storageability by resisting damage from moisture and/or biological activity.

13 Claims, 2 Drawing Sheets

U.S. PATENT DOCUMENTS

| | | | |
|---|---|---|---|
| 4,279,794 A | 7/1981 | Dumas | |
| 4,323,602 A | 4/1982 | Parker | |
| 4,444,847 A | 4/1984 | Fujioka et al. | |
| 4,448,807 A | 5/1984 | Serlin | |
| 4,483,889 A | 11/1984 | Andersson | |
| 4,529,654 A | 7/1985 | Drum | |
| 5,017,416 A | 5/1991 | Imperial et al. | |
| 5,087,457 A | 2/1992 | Bryant et al. | |
| 5,125,996 A | 6/1992 | Campbell et al. | |
| 5,133,835 A | 7/1992 | Goettmann et al. | |
| 5,219,875 A | 6/1993 | Sherba et al. | |
| 5,342,649 A | 8/1994 | Sarokin | |
| 5,415,923 A | 5/1995 | Sarokin et al. | |
| 5,464,622 A | 11/1995 | Mehta et al. | |
| 5,472,757 A | 12/1995 | Ogawa et al. | |
| 5,514,429 A | 5/1996 | Kamihgaraguchi et al. | |
| 5,681,851 A | 10/1997 | Lee et al. | |
| 5,709,976 A | 1/1998 | Malhotra | |
| 5,776,619 A | 7/1998 | Shanton | |
| 5,817,180 A | 10/1998 | Ferguson et al. | |
| 5,817,214 A | 10/1998 | Sasaki et al. | |
| 5,885,340 A | 3/1999 | Bailey et al. | |
| 5,908,723 A | 6/1999 | Malhotra et al. | |
| 5,938,825 A | 8/1999 | Gaglani et al. | |
| 5,952,051 A | 9/1999 | Asano et al. | |
| 5,985,076 A | 11/1999 | Misuda et al. | |
| 6,022,816 A | 2/2000 | Dewar | |
| 6,034,081 A | 3/2000 | Whittemore et al. | |
| 6,048,575 A | 4/2000 | Altavilla | |
| 6,059,991 A * | 5/2000 | Gaglani et al. | 252/182.29 |
| 6,087,457 A | 7/2000 | Tsai | |
| 6,183,814 B1 | 2/2001 | Nangeroni et al. | |
| 6,197,805 B1 | 3/2001 | Smith | |
| 6,210,767 B1 | 4/2001 | Knauf | |
| 6,221,798 B1 | 4/2001 | Mahale et al. | |
| 6,241,994 B1 | 6/2001 | Lee et al. | |
| 6,291,127 B1 | 9/2001 | Dagan et al. | |
| 6,358,576 B1 | 3/2002 | Adur et al. | |
| 6,379,497 B1 | 4/2002 | Sandstrom et al. | |
| 6,387,500 B1 | 5/2002 | Behl | |
| 6,645,642 B2 | 11/2003 | Kulkarni et al. | |
| 6,951,962 B2 | 10/2005 | Bottorff | |
| 2002/0040088 A1 | 4/2002 | Hauschel et al. | |
| 2002/0185239 A1 | 12/2002 | Kimpimaki et al. | |
| 2006/0207738 A1 | 9/2006 | Wild | |
| 2007/0113997 A1 | 5/2007 | Glittenberg | |
| 2008/0128070 A1 | 6/2008 | Goldman | |

FOREIGN PATENT DOCUMENTS

| | | |
|---|---|---|
| EP | 290115 | 11/1988 |
| EP | 0551893 | 1/1993 |
| EP | 0629741 | 12/1994 |
| EP | 0666368 | 8/1995 |
| EP | 880892 | 12/1998 |
| EP | 1040935 | 10/2000 |
| GB | 786543 | 10/1955 |
| GB | 903416 | 11/1959 |
| GB | 1373788 | 10/1971 |
| GB | 1533434 | 3/1976 |
| GB | 2307487 | 5/1997 |
| JP | 61020798 | 1/1986 |
| JP | 61097204 | 5/1986 |
| JP | 5246164 | 9/1993 |
| JP | 06065897 | 3/1994 |
| JP | 06157215 | 6/1994 |
| JP | 668853 | 9/1994 |
| JP | 06329834 | 11/1994 |
| JP | 08337078 | 12/1996 |
| JP | 10034791 | 2/1998 |
| JP | 2983788 | 9/1999 |
| JP | 2000511239 | 8/2000 |
| WO | 9745590 | 12/1997 |
| WO | WO9852765 | 11/1998 |
| WO | WO9916973 | 4/1999 |
| WO | WO9963157 | 12/1999 |
| WO | WO0044983 | 8/2000 |
| WO | WO0194512 | 12/2001 |
| WO | 0207984 | 1/2002 |
| WO | 02085539 | 10/2002 |
| WO | WO02084026 | 10/2002 |
| WO | WO02085539 | 10/2002 |

OTHER PUBLICATIONS

"Technology Review Series Triclosan and Its Impurities," by J. Menoutis, Ph.D, copyright 1998-2001 Quantex Laboratories (2 pgs.).

"Handbook for Pulp Paper Technologies", 2nd Edition, G.A. Smook, Angus Wilde Publications (1992).

C.E. Farley and R. B. Wasser in The Sizing of Paper, Second Edition, edited by W.F. Reynolds, Tappi Press, 1989, pp. 51-62.

E. Strazdins in The Sizing of Paper, Second Edition, edited by W. F. Reynolds, Tappi Press, 1989, pp. 1-33.

* cited by examiner

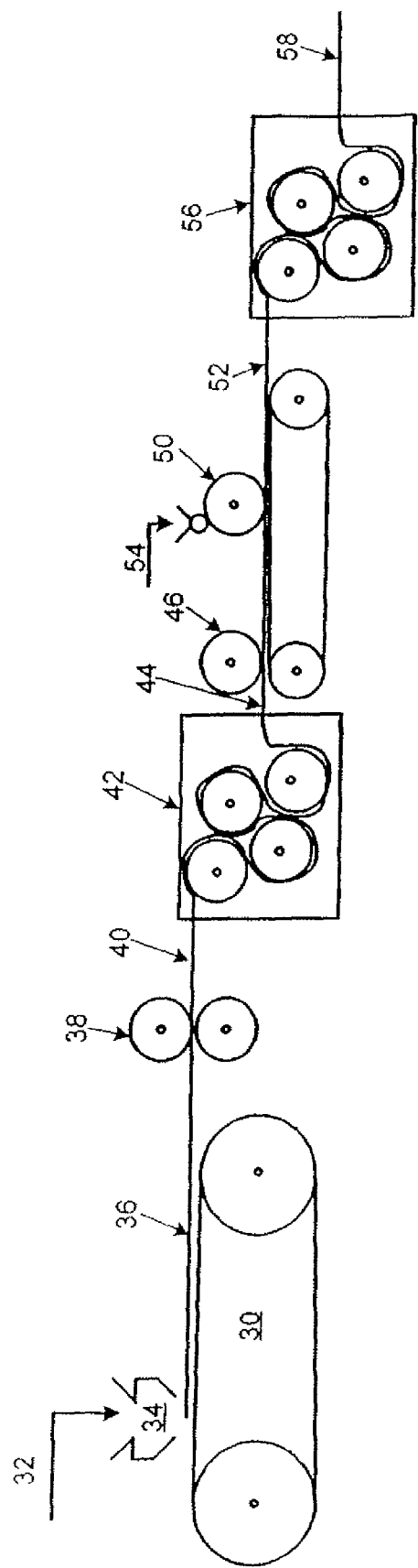

PAPER ARTICLES EXHIBITING LONG TERM STORAGEABILITY AND METHOD FOR MAKING SAME

This application is a Continuation of U.S. application Ser. No. 10/685,899, filed Oct. 15, 2003, now U.S. Pat. No. 7,794,850; which is a Division of U.S. application Ser. No. 10/117,358, filed Apr. 5, 2002, now U.S. Pat. No. 6,645,642; and claims the benefit of provisional application Ser. No. 60/283,055, filed Apr. 11, 2001, of provisional application Ser. No. 60/283,677, filed Apr. 12, 2001, and of provisional application Ser. No. 60/283,066, filed Apr. 11, 2001.

FIELD OF THE INVENTION

The invention relates to the papermaking art and, in particular, to the manufacture of paper products having basis weights above about 80 pounds per 3000 square feet up to and including about 300 pounds per 3000 square feet, such as file folders, non-corrugated containers, and the like, which exhibit improved properties for office environments and long term storage.

BACKGROUND OF THE INVENTION

Heavy weight cellulosic paper and paperboard products such as file folders and paperboard file containers are often subject to liquid or moisture damage during routine handling and long term storage. In addition, such products, if stored in a humid environment, tend to support biological growth which results in undesirable odors being produced. Furthermore, such products may be damaged or soiled by aqueous liquids thereby discoloring the paper or paperboard products. If moisture or aqueous liquid are absorbed by the paper or paperboard materials, the materials may become soggy, warped and/or weakened thereby reducing their usefulness and potentially allowing the liquids to contact and damage documents which may be stored in containers made with the paper or paperboard materials.

Accordingly, there exists a need for improved cellulose-based products, and in particular relatively heavy weight paper and paperboard products, which exhibit improved resistance to moisture, water, and/or microbial growth.

SUMMARY OF THE INVENTION

With regard to the above and other objects and advantages, the invention provides a method for increasing the long term storageability of a cellulosic paper or paperboard product. The method includes providing a paper or paperboard product made from cellulosic fibers having a basis weight ranging from about 80 to about 300 pounds per 3000 square feet. A holdout material is applied to at least one surface of the paper or paperboard product to provide a sized web of paper or paperboard. The sized web is then coated with an ink receptive material selected from the group consisting of an aqueous acrylic polymer coating material, an aqueous biocidal agent and a combination of aqueous acrylic polymer coating material and aqueous biocidal agent to provide an ink receptive layer. Then the web is dried at a first temperature to provide a coated web. In order to reduce web cur, an uncoated side of the web is wetted with an aqueous fluid and dried at a second temperature to provide a paper or paperboard product having enhanced long term storageability.

In another embodiment the invention provides a method for reducing microbial growth on stored paper or paperboard products. The method includes providing a paper or paperboard product made from cellulosic fibers having a basis weight ranging from about 80 to about 300 pounds per 3000 square feet. At least one surface of the paper or paperboard product is sized with from about 0.5 to about 1.5 percent by weight starch sizing agent to provide a sized web of paper or paperboard. The sized web is coated with an aqueous biocidal agent and the web is dried to provide a paper or paperboard product having reduced tendency for microbial growth.

Another embodiment of the invention provides a paper or paperboard composite having enhanced long term storageability. The paper or paperboard composite includes a base layer formed from a cellulosic fiber substrate, the base layer having a first surface, second surface and a basis weight ranging from about 80 to about 300 pounds per 3000 square feet. A holdout layer is applied adjacent the first surface of the base layer. An ink receptive coating material is applied adjacent the holdout layer to provide an ink receptive layer. The ink receptive coating material is selected from the group consisting of an aqueous acrylic polymer coating material, an aqueous biocidal agent and a combination of aqueous acrylic polymer coating material and aqueous biocidal agent.

An advantage of the invention is that relatively heavy weight paper and paperboard products may be stored for a long term without significant deterioration or production of odor causing organisms. The products of the invention also exhibit improved long term durability and resist damage and staining caused by water and other aqueous fluids. Another advantage of the invention is that paper and paperboard webs made according to the invention exhibit less tendency to slide relative to one another as compared thermoplastic coated webs which are difficult to stack on one another because of their slick surface.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows:

FIG. 4 is a schematic flow diagram, not to scale, of a process for making paper and paperboard products according to the invention.

DETAILED DESCRIPTION OF THE INVENTION

With reference now to FIGS. 1-4, the invention provides a web 10 having a holdout layer 12 and a print receptive layer 14, 18, or 20. The print receptive layer 14, 18, or 20 will be described in more detail below. Layer 16 is preferably a printed image layer which is applied directly to or adjacent to the print receptive layer 14, 18, or 20 preferably by a printing process selected from a flexographic printer, a lithographic printer, a rotogravure printer, and the like. Accordingly, the print receptive layer 14, 18, or 20 is preferably a lipophilic or hydrophobic print receptive layer. In an alternative, a printed image may be applied directly to the holdout layer 12 and the printed image then coated with the print receptive layer 14, 18, or 20. Thus the print receptive layer 14, 18, or 20 of the alternative embodiment provides an additional surface for accepting a printed image to complement the image printed on the holdout layer 12.

The web 10 is preferably a paper or paperboard web made of cellulose fibers by a conventional papermaking process having a basis weight preferably ranging from about 80 to about 300 pounds per 3000 square feet or more. Hence, the paper or paperboard is relatively inflexible as compared to paper having a lower basis weight. A particularly preferred web 10 is a paperboard web used for making file folders, manila folders, flap folders such as Bristol base paper, and other substantially inflexible paperboard webs for use in office environments, including, but not limited to paperboard containers for such folders, and the like.

The web 10 is preferably coated rather than impregnated with the print receptive layer 14, 18, or 20. Accordingly, after the web is formed, calendered and dried, a holdout layer 12 is preferably applied to at least one surface of the web 10. If both surfaces of the web are coated with the print receptive layer 14, 18, or 20, then the holdout layer 12 is preferably applied to both surfaces of the web 10. The preferred holdout layer 12 is provided by a sizing agent such as a starch sizing agent. When a starch sizing agent is used as the holdout layer 12, the sizing agent is preferably applied to a surface of the web 10 using about 0.5 to about 1.5 weight percent starch size from a water box. The holdout layer 12 and method for applying the holdout layer 12 to the web are not critical to the invention provided a holdout layer 12 is provided which inhibits significant penetration or absorption of the print receptive layer 14, 18, or 20 into the web 10.

Figure 1:
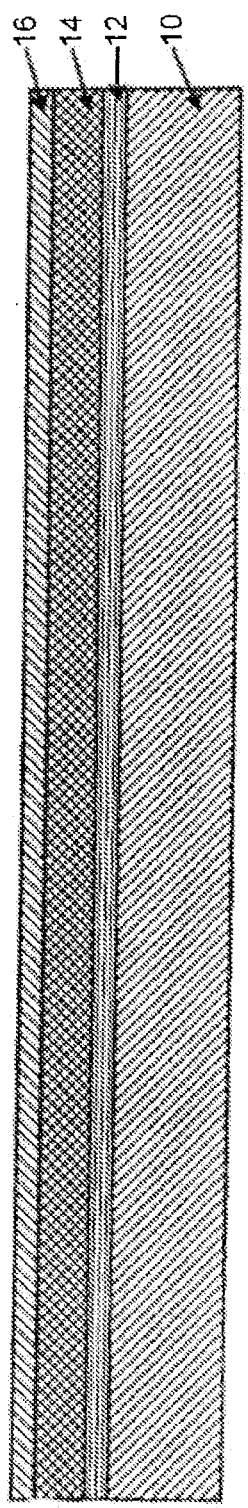
FIGS. 1-3 are cross-sectional views not to scale of paper or paperboard products according to the invention.

With reference to FIG. 1, a preferred print receptive layer 14 includes a layer made from an aqueous acrylic coating material including an agent for reducing biological activity on the web 10. The acrylic coating material for providing layer 14 is preferably an acrylic polymer emulsion or dispersion in an aqueous carrier liquid. The acrylic polymer or emulsion preferably contains from about 35 to about 40 weight percent acrylic polymer solids and is preferably a film forming material which is effective to increase the resistance of the web 10 to wetting with aqueous fluids. A particularly preferred acrylic polymer emulsion material for providing layer 14 is available from Michelman, Inc. of Cincinnati, Ohio under the trade name MICRYL 474. The MICRYL 474 coating material has been used in the prior art as a paper coating for flexible cement bags. The lightweight coated paper used for cement bags was laminated to a plastic film for making the bag.

Whether or not layer 14 includes the biocidal agent, the acrylic polymer coating material may also include other additives to improve the ink receptability of the ink receptive layer 14. Such other additives include, but are not limited to, silica, clay, polyvinyl alcohol or cross-linked acrylics. Layer 14 may be applied to the holdout layer 12 by a wide variety of coating methods including, but not limited to, use of a flexographic coater, a rod coater, a rotogravure coater, an offset coater, a knife over roll coater, a lithographic coater, a dip coater, and a spray coater. The coating weight applied to the holdout layer 12 is preferably in the range of from about 1.5 to about 3.0 pounds per 3000 square feet to provide ink receptive layer 14.

An important property of the webs made according to the invention is their water shedability or resistance to wetting by aqueous fluids. The resistance of the web to wetting by aqueous fluids is determined by the Cobb Sizing Test, according to ASTM D-3285 (TAPPI T-441). Conventional, sized webs used for file folders have a five minute water absorption in the range of from about 50 to 70 grams per square meter of paper tested. The web 10 containing holdout layer 12 and print receptive layer 14 preferably has a five minute water absorption in the range of from about 30 to about 40 grams per square meter.

A tester for performing the Cobb sizing test consists of a hollow metal cylinder or ring (100, 25 or 10 cm$^2$ inside area). A metal base plate with a clamping device is used to hold the ring against the sample of paper to be tested and a neoprene mat. Neoprene gaskets may be used to seal the cylinder against the web when the test sample is uneven. An important component of the test apparatus is a solid stainless steel roller having a smooth face about 20 cm wide and weighing about 10 kg. Also used for the test are a 100 mL graduated cylinder, a balance with sensitivity of 0.01 grams or better, blotting paper, and a timer or stopwatch.

A sample of paperboard material to be tested is cut approximately 12.5×12.5 cm square from the coated web. The sample is weighed and placed on the neoprene mat. The cylinder is clamped upon the sample by locking a crossbar in place and tightening two knobs. If sample material is textured, a gasket is placed between the sample and cylinder, carefully aligning the inner edges of each. The test liquid, in this case preferably water is poured into the test cylinder. The amount of test liquid is preferably 100 mL for 100 square centimeter cylinder. Proportionately less liquid is used for smaller cylinders. After pouring the liquid, the timer is started to provide a five minute test. Longer and shorter test periods may be provided. At fifteen seconds before the expiration of the predetermined test period, the liquid is quickly poured from the cylinder, using care in not dropping any liquid on the untreated (outside) portion of the test specimen. The cylinder is removed from the sample and the sample is placed with wetted side up on a sheet of blotting paper.

At exactly the end of the predetermined test period, a second sheet of blotting paper is placed on top of the sample to remove the surplus liquid by moving the hand roller once forward and once backward over the sample and blotting paper. Care should be taken not to exert downward force on the roller. The specimen is then folded after removing it from between the blotter sheets and re-weighed to the nearest 0.01 gram. The initial weight of the web is subtracted from the final weight of the sample and the gain in weight in grams is multiplied by 100 for a 100 cm$^2$ cylinder to obtain the weight of liquid absorbed in grams per square meter.

The resistance of the coated web to staining is determined by pouring a small amount of aqueous liquid such as coffee, soda, juice onto the coated web. The aqueous fluid is then wiped off after 30 seconds and the web is visually examined for evidence of staining or warping. Webs produced according to the invention exhibited less staining with dark fluids and less warping than conventional webs.

The agent for reducing biological activity included in layer 14 is preferably a haloalkynyl carbamate. A particularly preferred haloalkynyl alkyl carbamate is a halopropynyl carbamate, most preferably 3-iodo-2-propynyl butyl carbamate available as a latex dispersion wherein the active ingredient is present in the dispersion in an amount ranging from about 15 to about 30 percent by weight of the dispersion. Particularly preferred biocidal agents include aqueous dispersions available from Buckman Laboratories of Memphis, Tenn. under the trade names BUSAN 1420, BUSAN 1440, and BUSAN 1192D. Another preferred biocidal agent is available from Troy Technology Corporation, Inc. of Wilmington, Del. under the trade names POLYPHASE 641 and POLYPHASE P100. Still another preferred biocidal agent is available from Progressive Coatings of Shreveport, La. under the trade name VJ2180N.

The biocidal agent may be applied to both surface of the web with or without the acrylic polymer coating material. In the embodiment represented by FIG. 1, the biocidal agent is mixed with the acrylic polymer coating material in an amount preferably ranging from about 0.25 to about 4 weight percent of the total acrylic polymer coating material applied as layer 14.

After coating the web 10 and layer 12 with the acrylic polymer coating material, the web is dried to provide ink receptive layer 14 for receiving print 16. The web is preferably dried in an oven or using drying rolls at a temperature ranging from about 110° to about 200° C. to provide a web temperature not to exceed about 85° C. The entire coating and drying process is preferably conducted on a moving web running at about 300 to about 800 feet per minute or more.

In order to reduce web curl when only one side of the web 10 is coated with the holdout layer 12 and ink receptive layer 14, it is particularly preferred to wet the uncoated side of the web with an aqueous fluid such as water. In this case a minimal amount of water is used to wet the uncoated side of the web. A minimal amount of water may be applied to the uncoated side of the web using, for example, a zero rod.

Figure 2:
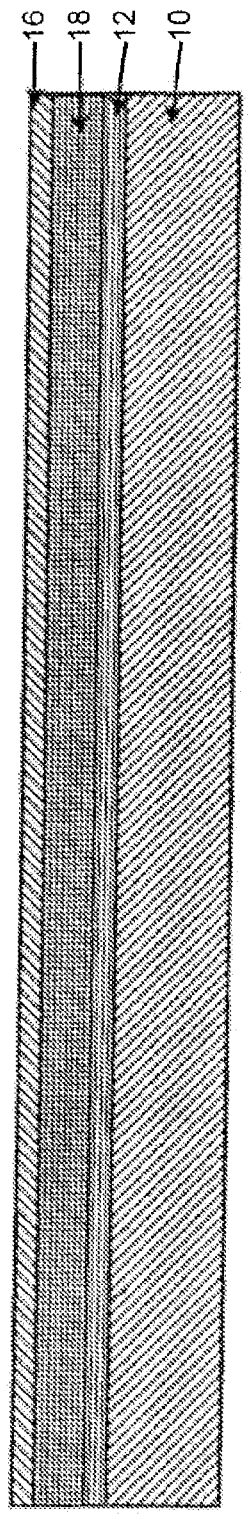

In the embodiment illustrated in FIG. 2, the web 10 includes holdout layer 12 and ink receptive layer 18. The ink receptive layer 18 is preferably provided by coating the holdout layer 12 with the above described film forming acrylic polymer material without the biocidal agent incorporated in the acrylic polymer material. Accordingly, the product illustrated in FIG. 2 is also receptive to a print layer 16 and exhibits a similar resistance to wetting as the web described with reference to FIG. 1 above.

Figure 3:
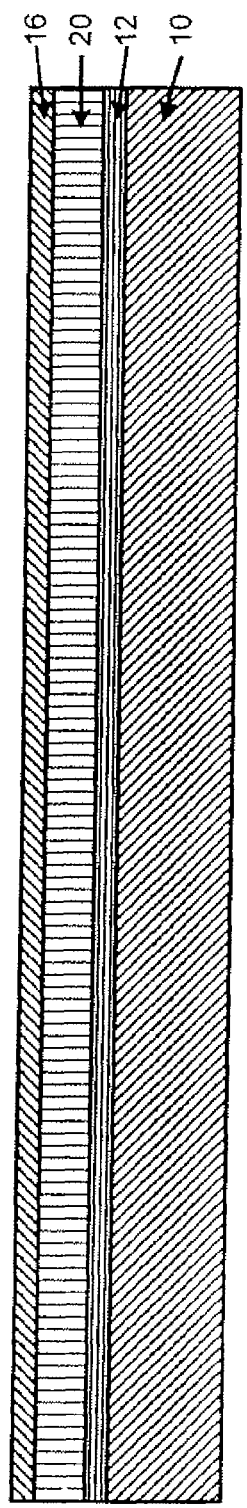

FIG. 3 illustrates an embodiment of the invention wherein the ink receptive layer 20 is provided by coating the holdout layer 12 with an aqueous dispersion containing the biocidal agent described above. In this case, the holdout layer 12 is preferably coated with the biocidal agent provided as a latex coating material using a flexographic coater, a blade-over-roll coater, a rotogravure coater, or an applicator roll coater. The preferred coater is a flexographic coater having an anilox cylinder containing at least about 250 cells per linear inch, each cell having a volume of about 7.0 billion cubic microns per square inch (bcm). The line speed for the coater is preferably about 200 to 300 feet per minute or higher. After coating the web with the ink receptive layer 20, the web is dried as above in an oven or using drying rolls at a temperature ranging from about 110° to about 200° C. to provide a web temperature not to exceed about 85° C. When the web is coated with only the biological activity reducing agent, it is particularly preferred to coat both surface of the web 10. Accordingly, the holdout layer 12 is preferably applied to both surface of the web 10.

A process for making webs according to the invention is illustrated in FIG. 4. A web for use according to the invention is made by a conventional papermaking process. Accordingly, the web may be formed on a papermaking machine 30 from a furnish 32 provided to a headbox 34 to yield formed web 36. The formed web 36 is calendered by calender rolls 38 to provide calendered web 40. The calendered web 40 is then dried in web dryer 42 to provide a dried web 44. The dried web 44 is then sized by sizing rolls 46 to provide a web 48 containing holdout layer 12. Next, the web 48 is coated with ink receptive layer 14, 18, or 20 by coater 50 to provide coated web 52. The coating material 54 is preferably applied to the web 48 using coater 50. After coating the web, the coated web 52 is dried in dryer 56 to provide web 58 having an ink receptive layer as described above.

As set forth above, if only one side of the web is coated with the ink receptive layer 14, 18, or 20 and holdout layer 12, then it is preferred to rewet the uncoated side of the web with an aqueous fluid and redry the web to reduce web curl.

In the following example, uncoated paper was coated with MICRYL 474 coating from Michelman, Inc. using a number three rod, and the web was dried by forced air having an air temperature of about 176° C. to provide a coated web. Next, the uncoated side of the web was wet with water using a zero rod. The web as then dried at about 120° to reduce web curl. The coating an wetting steps were conducted on line at about 400 feet per minute. The watershedability of the coated web was determined according to the five minute Cobb sizing test described above. The results are given in the following table.

TABLE

| Sample No. | Uncoated paper basis weight in pounds per 3000 square feet | Coating weight of MICRYL 474 coating in pounds per 3000 square feet | 5-minute Cobb value in grams per square meter |
|---|---|---|---|
| 1 | 124 | 2.5 | 32 |
| 2 | 143 | 1.5 | 35 |

As shown by the foregoing examples, paper coated with as little as 1.5 pounds per 3000 square feet of the MICRYL 474 coating material provided reduced water absorption as compared to conventional uncoated webs which have a water absorption in the range of from about 55 to about 60 grams per square meter as determined by the five minute Cobb to sizing test.

Having now described various aspects of the invention and preferred embodiments thereof, it will be recognized by those of ordinary skill that numerous modifications, variations and substitutions may exist within the spirit and scope of the appended claims.

What is claimed is:

1. A method of making a paper or paperboard, comprising
forming a base layer comprising cellulosic fibers;
contacting a sizing solution to the base layer to form a holdout layer comprising starch thereby providing a sized paper or paperboard;
contacting a coating composition to the sized paper or paperboard to form an ink receptive layer comprising at least one biocide;
to obtain a paper or paperboard, having a basis weight that is greater than or equal to about 80 pounds per 3000 square feet, and comprising:
a base layer comprising cellulosic fibers;
an ink receptive layer comprising at least one biocide; and
a holdout layer disposed between the base layer and the ink receptive layer, wherein the holdout layer comprises starch.

2. The method according to claim 1, wherein the sizing solution comprises from 0.5 to 1.5 wt % of starch.

3. The method according to claim 1, wherein the coating composition further comprises at least one acrylic polymer.

4. The method according to claim 1, wherein the coating composition further comprises at least one acrylic polymer in the form of an emulsion.

5. The method according to claim 1, wherein the coating composition further comprises from about 30 to about 45 wt % of at least one acrylic polymer.

6. The method according to claim 1, wherein the coating composition is contacted with the sized paper at an effective amount so as to form an ink receptive layer having a coating weight of from about 1.5 to about 3.0 pounds per 3000 square feet.

7. The method according to claim 1, wherein the coating composition comprises at least one biocide in the form of a dispersion.

8. The method according to claim 1, wherein the coating composition comprises from about 15 to about 30 wt % of the biocide.

9. The method according to claim 1, further comprising drying the paper or paperboard at a first temperature.

10. The method according to claim 1, further comprising wetting an uncoated side of the paper or paperboard with an aqueous fluid.

11. The method according to claim 1, wherein the coating composition comprises water and an acrylic polymer.

12. The method according to claim 1, wherein the paper or paperboard has a basis weight ranging from about 80 to about 300 pounds per 3000 square feet.

13. The method according to claim 1, wherein the paper or paperboard is at least one member selected from the group consisting of a file folder, a paperboard file container, a manila folder, a flap folder, and Bristol base paper.

* * * * *